United States Patent
Kino

(10) Patent No.: US 10,608,513 B2
(45) Date of Patent: Mar. 31, 2020

(54) ROTOR MANUFACTURING APPARATUS

(71) Applicant: TOYOTA JIDOSHA KABUSHIKI KAISHA, Toyota-shi, Aichi-ken (JP)

(72) Inventor: Masahiro Kino, Ichinomiya (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 224 days.

(21) Appl. No.: 15/808,339

(22) Filed: Nov. 9, 2017

(65) Prior Publication Data

US 2018/0183305 A1 Jun. 28, 2018

(30) Foreign Application Priority Data

Dec. 27, 2016 (JP) ................................. 2016-253043

(51) Int. Cl.
| | |
|---|---|
| *H02K 15/03* | (2006.01) |
| *H02K 1/27* | (2006.01) |
| *H02K 1/28* | (2006.01) |
| *B29C 45/14* | (2006.01) |
| *B29C 45/00* | (2006.01) |
| *B29L 31/00* | (2006.01) |

(52) U.S. Cl.
CPC ............ *H02K 15/03* (2013.01); *B29C 45/00* (2013.01); *B29C 45/14065* (2013.01); *B29C 45/14819* (2013.01); *H02K 1/276* (2013.01); *H02K 1/28* (2013.01); *B29C 2045/14122* (2013.01); *B29L 2031/7498* (2013.01)

(58) Field of Classification Search
CPC .......... H02K 15/03; H02K 1/276; H02K 1/28; B29C 45/14065; B29C 45/14819; B29C 2045/14122; B29L 2031/7498
See application file for complete search history.

(56) References Cited

U.S. PATENT DOCUMENTS

| | | | |
|---|---|---|---|
| 2004/0151795 A1 | 8/2004 | Hoppe et al. | |
| 2012/0139377 A1* | 6/2012 | Kim ...................... | H02K 1/276 310/156.21 |
| 2014/0077652 A1 | 3/2014 | Yamagishi et al. | |
| 2015/0236558 A1* | 8/2015 | Oketani .................. | H02K 1/28 310/43 |
| 2016/0134179 A1 | 5/2016 | Nagai et al. | |

(Continued)

FOREIGN PATENT DOCUMENTS

| | | |
|---|---|---|
| CN | 103597714 A | 2/2014 |
| JP | 2004-531197 A | 10/2004 |

(Continued)

*Primary Examiner* — Robert B Davis
(74) *Attorney, Agent, or Firm* — Sughrue Mion, PLLC

(57) ABSTRACT

A rotor manufacturing apparatus 1 is provided, the rotor manufacturing apparatus 1 including: a first mold 2 and a second mold 3 respectively arranged on one end surface and another end surface in the axial direction of a cylindrical rotor core 40 in order to seal the magnet insertion hole 42 in the process of filling the gap between a permanent magnet 51 and a magnet insertion hole 42 with the resin material 52 and solidifying a resin material 52, in which each of the first mold 2 and the second mold 3 is provided with positioning protrusion parts 6a, 6b, 7a, and 7b that are protruded in the axial direction and are intended to position the permanent magnet 51 in a predetermined position with respect to the magnet insertion hole 42.

2 Claims, 18 Drawing Sheets

(56) References Cited

U.S. PATENT DOCUMENTS

2016/0294262 A1* 10/2016 Yomoda ................ H02K 15/03
2019/0109525 A1*  4/2019 Gangi .................... H02K 15/12

FOREIGN PATENT DOCUMENTS

| JP | 2011-91913 A | 5/2011 |
| JP | 2014-222964 A | 11/2014 |
| JP | 2016-93006 A | 5/2016 |
| WO | 2012/169043 A1 | 12/2012 |

* cited by examiner

ROTOR MANUFACTURING APPARATUS

CROSS REFERENCE TO RELATED APPLICATIONS

This application is based upon and claims the benefit of priority from Japanese patent application No. 2016-253043, filed on Dec. 27, 2016, the disclosure of which is incorporated herein in its entirety by reference.

BACKGROUND

The present invention relates to a rotor manufacturing apparatus.

A method of manufacturing a rotor including a permanent magnet is known in which, the permanent magnet is inserted into a magnet insertion hole formed in a rotor core and then the gap between the permanent magnet and the magnet insertion hole is filled with resin such as a thermosetting resin to fix the permanent magnet into the rotor core. Japanese Unexamined Patent Application Publication No. 2014-222964 discloses a manufacturing method of a rotor in which a permanent magnet is inserted into a magnet insertion hole with a plurality of band-shaped or string-shaped insertion members being wound there around, so that the permanent magnet is fitted into the magnet insertion hole via the insertion member.

SUMMARY

However, when the permanent magnet is positioned in the magnet insertion hole using the band-shaped or string-shaped insertion members as disclosed in the manufacturing method of the rotor disclosed in Japanese Unexamined Patent Application Publication No. 2014-222964, at the time of filling the magnet insertion hole with resin, the permanent magnet may be moved due to a resin pressure, which may cause the position of the permanent magnet with respect to the magnet insertion hole to be deviated.

In order to prevent the position of the permanent magnet with respect to the magnet insertion hole from being deviated due to a resin pressure when the magnet insertion hole is filled with resin, a protrusion for positioning the permanent magnet may be provided on a side wall of the magnet insertion hole. FIG. 18 is a plan view showing a configuration around magnet insertion holes 542 in a rotor 550 which is under development. As shown in FIG. 18, a permanent magnet 51 is inserted into the magnet insertion hole 542 and the gap between the magnet insertion hole 542 and the permanent magnet 51 is filled with a resin material 52. Positioning protrusions 542a for positioning the permanent magnet 51 are formed on the side walls of the magnet insertion hole 542. However, there is a problem that, when the positioning protrusions 542a are provided on the side walls of the magnet insertion hole 542, an inefficient magnetic flux $\Phi L$ is generated in parts of the permanent magnet 51 that contact the positioning protrusion 542a.

The present invention has been made in view of the aforementioned background and aims to provide a rotor manufacturing apparatus capable of reliably positioning the permanent magnet in the magnet insertion hole while suppressing generation of inefficient magnetic flux.

The present invention provides a rotor manufacturing apparatus configured to fill a gap between a permanent magnet and a magnet insertion hole with a resin material in a cylindrical rotor core having the magnet insertion hole which penetrates in an axial direction into which the permanent magnet has been inserted, the rotor manufacturing apparatus including: a first mold and a second mold respectively arranged on one end surface and another end surface in the axial direction of the rotor core in order to seal the magnet insertion hole in the process of filling the gap between the permanent magnet and the magnet insertion hole with the resin material and solidifying the resin material, in which each of the first mold and the second mold is provided with a positioning protrusion part that is protruded in the axial direction and is intended to position the permanent magnet in a predetermined position with respect to the magnet insertion hole.

The first mold and the second mold are respectively arranged on one end surface and another end surface in the axial direction of the rotor core in order to seal the magnet insertion hole in the process of filling the gap between the permanent magnet and the magnet insertion hole with the resin material and solidifying the resin material. The first mold and the second mold are each provided with a positioning protrusion part that is protruded in the axial direction. When the gap between the permanent magnet and the magnet insertion hole is filled with the resin material, the permanent magnet is positioned in a predetermined position with respect to the magnet insertion hole by the positioning protrusion parts respectively provided in the first mold and the second mold. It is therefore possible to suppress, when the gap between the permanent magnet and the magnet insertion hole is filled with the resin material, the movement of the permanent magnet due to the resin pressure and the deviation of the position of the permanent magnet with respect to the magnet insertion hole. It is therefore possible to reliably position the permanent magnet in the magnet insertion hole of the rotor. Further, when the positioning protrusions for the permanent magnet are provided on the side walls of the magnet insertion hole, an inefficient magnetic flux is generated in the protruding parts. However, since the permanent magnet is positioned in the magnet insertion hole by the positioning protrusion parts respectively provided in the first mold and the second mold, there is no need to provide the protrusions for positioning the permanent magnet in the magnet insertion hole. It is therefore possible to suppress generation of inefficient magnetic flux.

Further, when a plurality of the permanent magnets are inserted into the one magnet insertion hole, each of the first mold and the second mold may be provided with a separating protrusion part that is protruded in the axial direction and is intended to arrange the permanent magnets that are adjacent to each other in the magnet insertion hole in such a way that they are separated from each other.

When the separating protrusion parts that are protruded in the axial direction are respectively provided in the first mold and the second mold, at the time when the gap between the permanent magnet and the magnet insertion hole is filled with the resin material, the permanent magnets that are adjacent to each other in the magnet insertion hole are arranged in such a way that they are separated from each other. Accordingly, since the permanent magnets that are adjacent to each other are separated from each other in the magnet insertion hole of the rotor, there is no need to arrange an insulation film between the permanent magnets that are adjacent to each other. It is therefore possible to reduce the cost for manufacturing the rotor.

According to the present invention, it is possible to reliably position the permanent magnet in the magnet insertion hole while suppressing the generation of inefficient magnetic flux.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

First Embodiment

Hereinafter, with reference to the drawings, a first embodiment of the present invention will be described.

Figure 1:
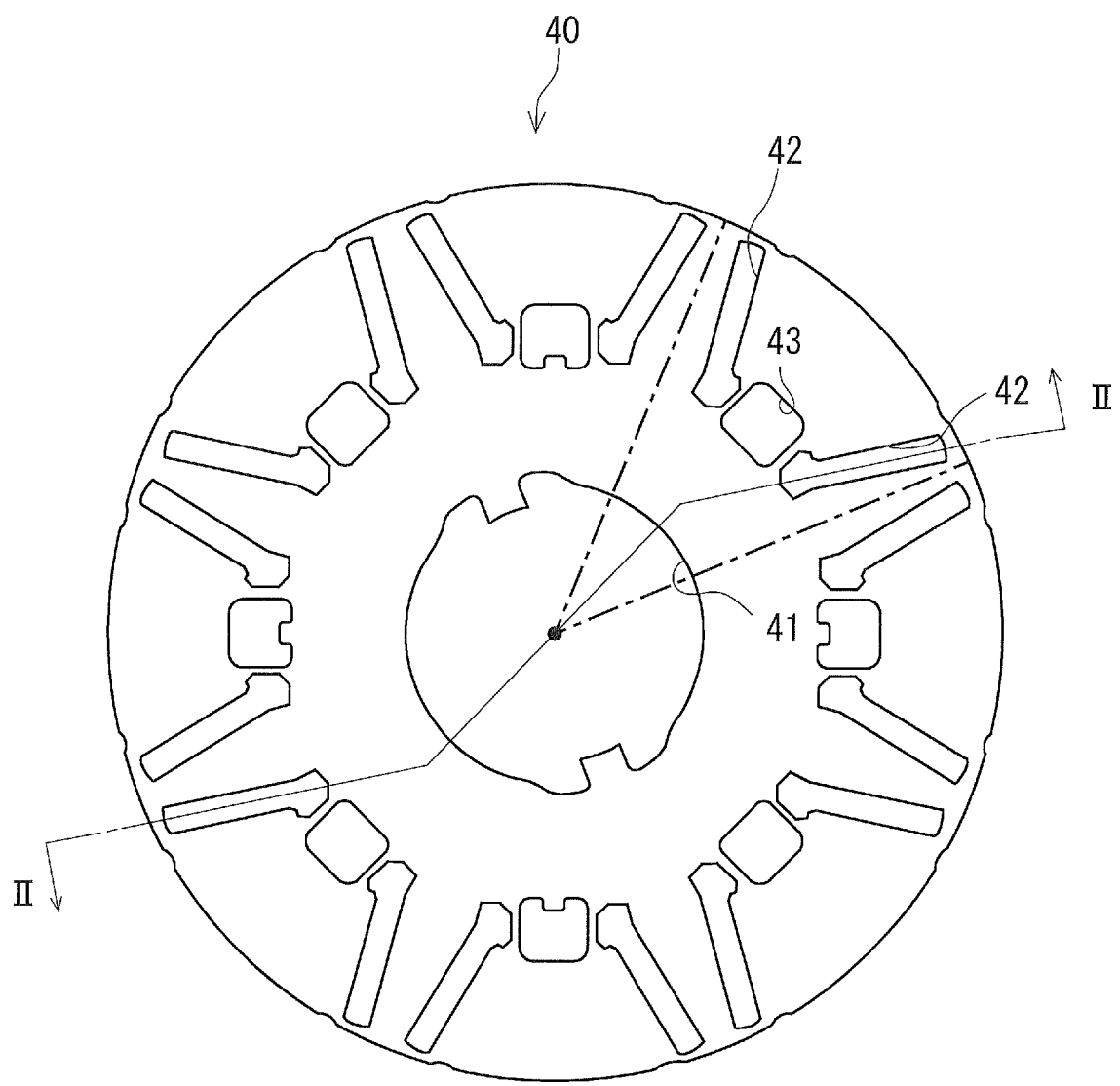
FIG. 1 is a plan view showing a rotor core included in a rotor manufactured by a manufacturing apparatus according to a first embodiment when the rotor core is seen from an axial direction.
Figure 2:
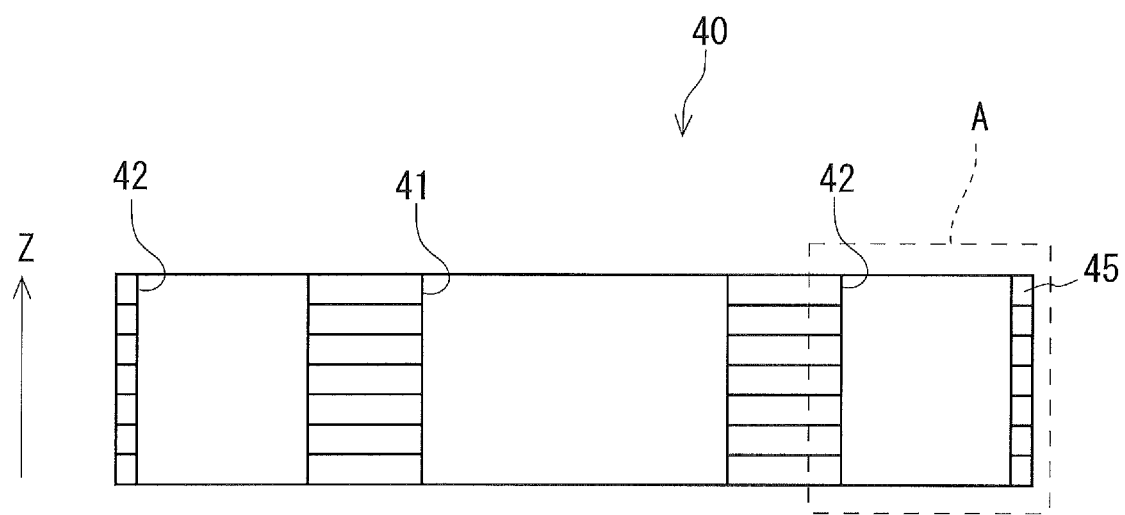
FIG. 2 is a cross-sectional view taken along the line II-II of FIG. 1.

First, with reference to FIGS. 1 and 2, a configuration of a rotor core included in a rotor manufactured in a manufacturing apparatus according to this embodiment will be described. FIG. 1 is a plan view when a rotor core 40 is seen from an axial direction. In FIG. 1, only the components in the region surrounded by the circular sector shown by an alternate long and short dash line are denoted by reference symbols and the components in the regions other than the region surrounded by the circular sector shown by the alternate long and short dash line will not be denoted by reference symbols. FIG. 2 is a cross-sectional view taken along the line II-II of FIG. 1.

As shown in FIGS. 1 and 2, the rotor core 40 has a cylindrical shape and includes a shaft hole 41 formed at substantially the center thereof, the shaft hole 41 penetrating in an axial direction Z and being intended to engage the rotation axis of the rotor. Further, a plurality of magnet insertion holes 42 penetrating in the axial direction Z into which permanent magnets are inserted and a plurality of magnetic flux leakage suppression holes 43 penetrating in the axial direction Z and are intended to suppress the leakage magnetic flux from the permanent magnets are formed in the rotor core 40. The rotor core 40 includes patterns repeated eight times at a pitch of 45° along a circumferential direction, each pattern being shown in the region surrounded by the circular sector shown by the alternate long and short dash line in FIG. 1. The rotor core 40 is formed of a plurality of annular steel plates 45 stacked upon one another (see FIG. 2).

Figure 3:
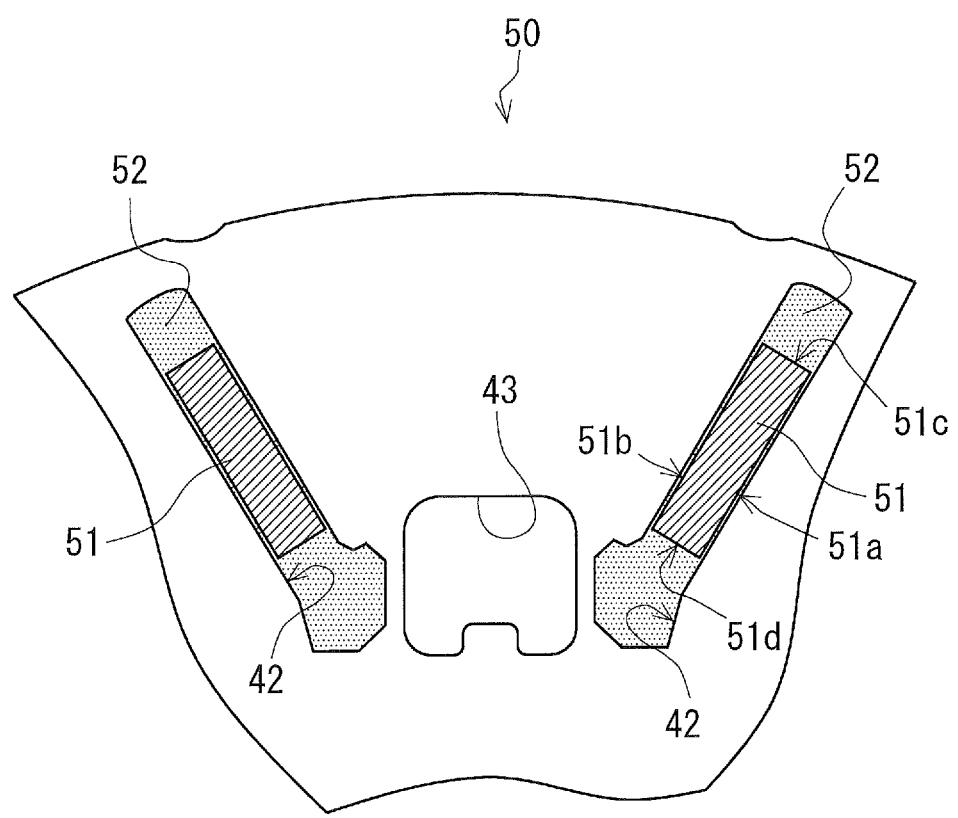
FIG. 3 is a plan view of a rotor including magnet insertion holes of the rotor core shown in FIG. 1 into which permanent magnets are inserted when the rotor is seen from the axial direction.

FIG. 3 is a plan view showing a rotor 50 including the magnet insertion holes 42 of the rotor core 40 shown in FIG. 1 into which permanent magnets 51 are inserted when the rotor 50 is seen from the axial direction. FIG. 3 shows only the region surrounded by the circular sector shown by the alternate long and short dash line in FIG. 1. As shown in FIG. 3, the gap between the magnet insertion hole 42 and the permanent magnet 51 is filled with a resin material 52 such as thermosetting resin, thereby fixing the permanent magnet 51 in the magnet insertion hole 42.

Figure 4:
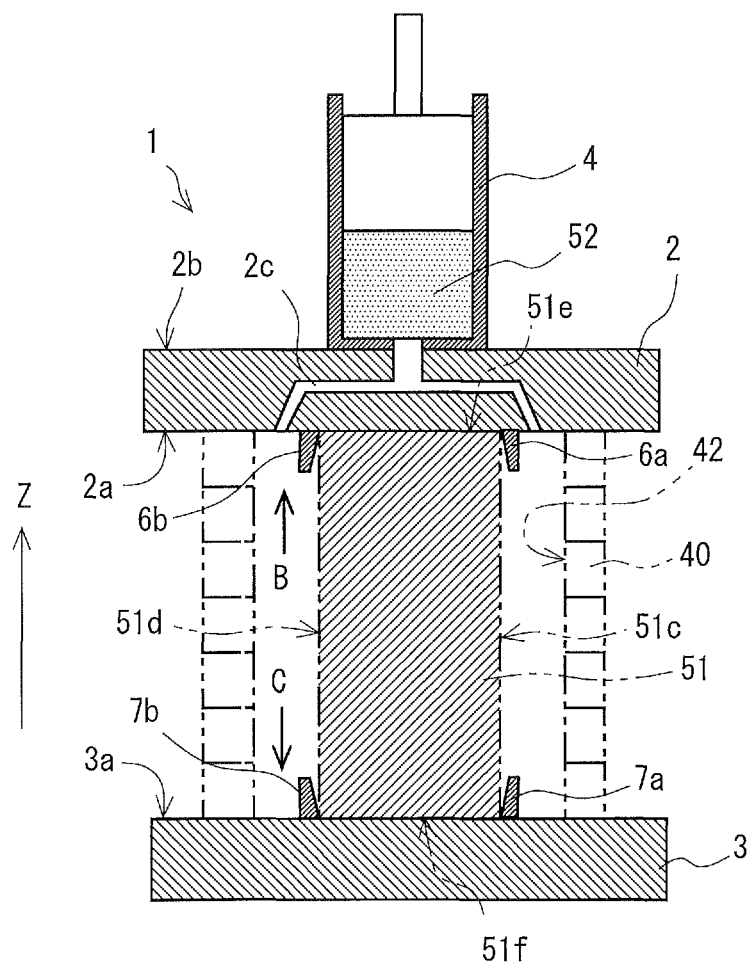
FIG. 4 is a schematic view showing a schematic configuration of a rotor manufacturing apparatus according to the first embodiment.
Figure 5:
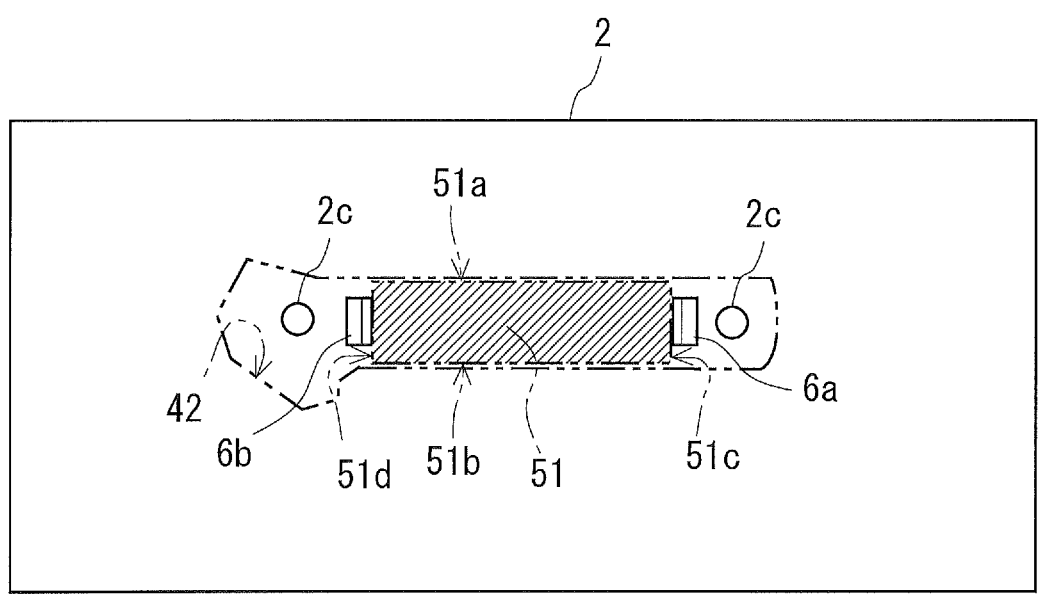
FIG. 5 is an arrow view when seen from an arrow B of FIG. 4.
Figure 6:
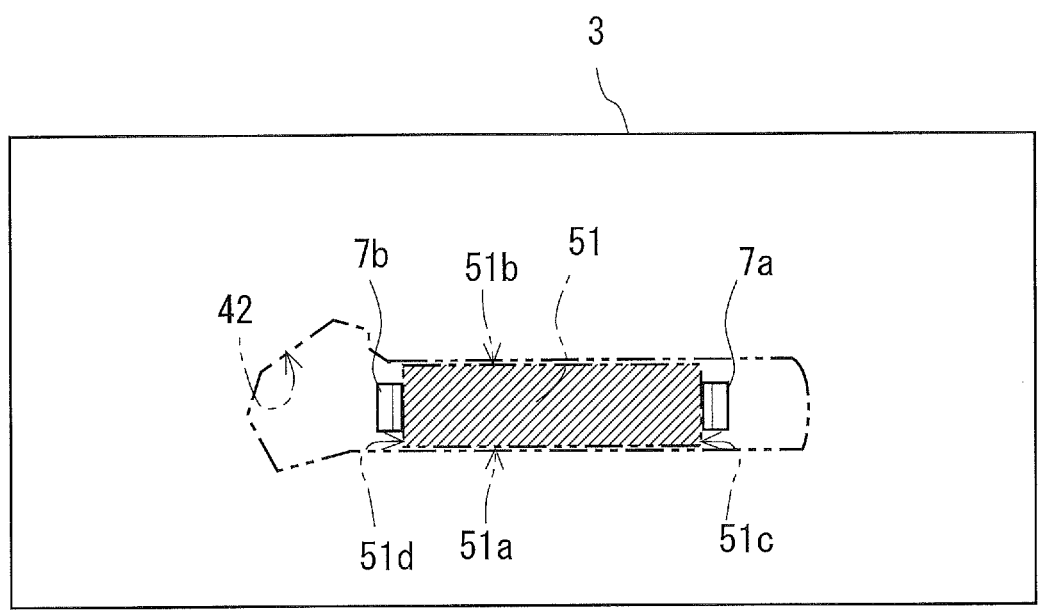
FIG. 6 is an arrow view when seen from an arrow C of FIG. 4.

Next, a structure of a rotor manufacturing apparatus 1 according to this embodiment will be described. FIG. 4 is a schematic view showing a schematic configuration of the rotor manufacturing apparatus 1. The rotor core 40 shown in FIG. 4 corresponds to the part of the rotor core 40 that is surrounded by a dashed line A shown in FIG. 2. FIG. 5 is an arrow view when seen from an arrow B of FIG. 4. FIG. 6 is an arrow view when seen from an arrow C of FIG. 4. As shown in FIG. 4, the rotor manufacturing apparatus 1 includes a first mold 2 and a second mold 3 that are respectively arranged on one end surface (upper end surface in FIG. 4) and the other end surface (lower end surface in FIG. 4) in the axial direction Z of the rotor core 40 in order to seal the magnet insertion hole 42 in a process of filling the gap between the permanent magnet 51 and the magnet insertion hole 42 with the resin material 52 and solidifying the resin material 52.

As shown in FIGS. 4 and 5, the first mold 2 seals one end side (upper side in FIG. 4) in the axial direction Z of the magnet insertion hole 42 into which the permanent magnet 51 has been inserted. On a surface 2b of the first mold 2, which is opposite to a surface 2a that is opposed to the permanent magnet 51, an injection apparatus 4 for injecting the resin material 52 into the magnet insertion hole 42 is provided. In the first mold 2, a path 2c that guides the resin material 52 injected by the injection apparatus 4 to the magnet insertion hole 42 is formed. Positioning protrusion parts 6a and 6b that are protruded in the axial direction Z and are intended to position one end surface 51e (upper end surface in FIG. 4) of the permanent magnet 51 in the axial direction Z in a predetermined position with respect to the magnet insertion hole 42 are provided on the surface 2a of the first mold 2 that is opposed to the permanent magnet 51.

A surface 51c of the permanent magnet 51 abuts against the positioning protrusion part 6a and a surface 51d of the permanent magnet 51 abuts against the positioning protrusion part 6b. Further, surfaces 51a and 51b (see FIG. 5) of the permanent magnet 51 abut against the side walls of the magnet insertion hole 42. Accordingly, one end surface 51e of the permanent magnet 51 in the axial direction Z is positioned in a predetermined position with respect to the magnet insertion hole 42.

As shown in FIGS. 4 and 6, the second mold 3 seals the opening of the other end side (lower side in FIG. 4) in the axial direction Z of the magnet insertion hole 42 into which the permanent magnet 51 has been inserted. Positioning protrusion parts 7a and 7b that are protruded in the axial direction Z and are intended to position the other end surface 51f (lower end surface in FIG. 4) of the permanent magnet 51 in the axial direction Z in a predetermined position with respect to the magnet insertion hole 42 are provided on a surface 3a of the second mold 3 that is opposed to the permanent magnet 51.

The surface 51c of the permanent magnet 51 abuts against the positioning protrusion part 7a and the surface 51d of the permanent magnet 51 abuts against the positioning protrusion part 7b. Further, the surfaces 51a and 51b of the permanent magnet 51 (see FIG. 5) are positioned by the side walls of the magnet insertion hole 42 that are proximate to the surfaces 51a and 51b of the permanent magnet 51. Accordingly, the other end surface 51f of the permanent magnet 51 in the axial direction Z is positioned in a predetermined position with respect to the magnet insertion hole 42.

In order to cause the permanent magnet 51 to be smoothly inserted between the positioning protrusion part 6a and the positioning protrusion part 6b, as shown in FIG. 4, the surface of the positioning protrusion part 6a that is opposed to the surface 51c of the permanent magnet 51 and the surface of the positioning protrusion part 6b that is opposed to the surface 51d of the permanent magnet 51 may be inclined surfaces that are inclined with respect to the axial direction. In a similar way, in order to cause the permanent magnet 51 to be smoothly inserted between the positioning protrusion part 7a and the positioning protrusion part 7b, as shown in FIG. 4, the surface of the positioning protrusion part 7a that is opposed to the surface 51c of the permanent magnet 51 and the surface of the positioning protrusion part 7b that is opposed to the surface 51d of the permanent magnet 51 may be inclined surfaces that are inclined with respect to the axial direction.

A method of manufacturing the rotor 50 from the rotor core 40 using the rotor manufacturing apparatus 1 will be described below.

Figure 7:
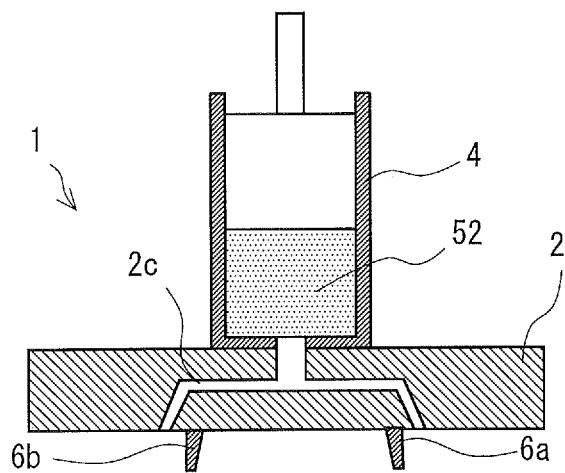
FIG. 7 is a diagram for describing a method of manufacturing the rotor from the rotor core using the rotor manufacturing apparatus according to the first embodiment.
Figure 7:
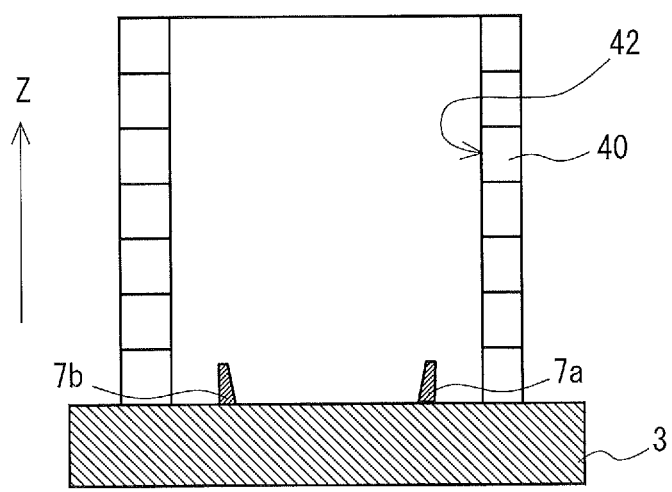
Figure 8:
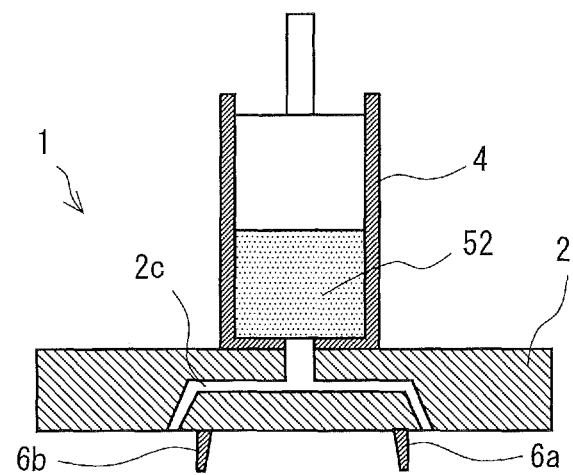
FIG. 8 is a diagram for describing a method of manufacturing the rotor from the rotor core using the rotor manufacturing apparatus according to the first embodiment.
Figure 8:
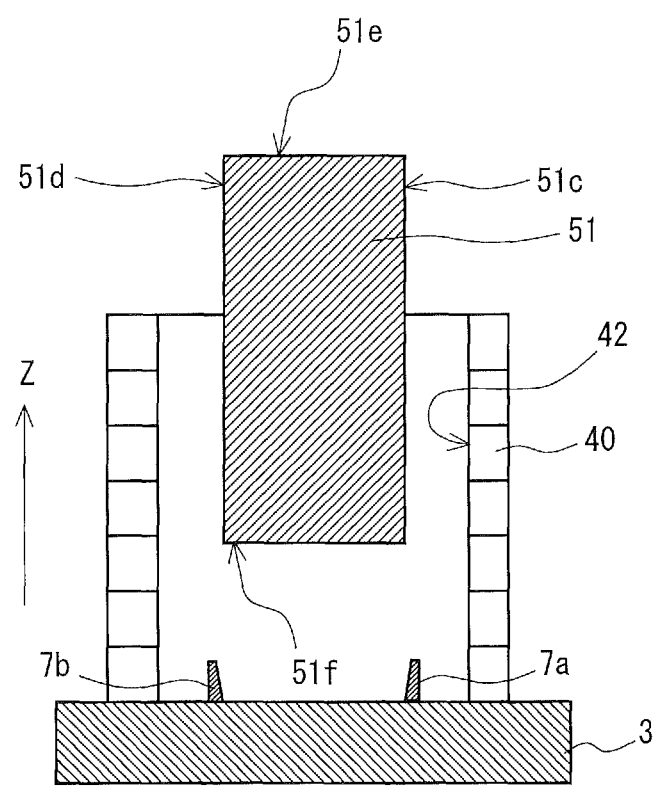

FIGS. 7 to 11 are diagrams for describing a method for manufacturing the rotor 50 from the rotor core 40 using the rotor manufacturing apparatus 1. First, as shown in FIG. 7, the second mold 3 is arranged on the other end surface (lower end surface in FIG. 7) of the rotor core 40 in such a way as to seal the opening of the other end side (lower side in FIG. 7) in the axial direction Z of the magnet insertion hole 42. Next, as shown in FIG. 8, the permanent magnet 51 is inserted from the opening of one end side (upper side in FIG. 7) in the axial direction Z of the magnet insertion hole 42. In this case, the surface 51c of the permanent magnet 51 is made to abut against the positioning protrusion part 7a and the surface 51d of the permanent magnet 51 is made to abut against the positioning protrusion part 7b.

Figure 9:
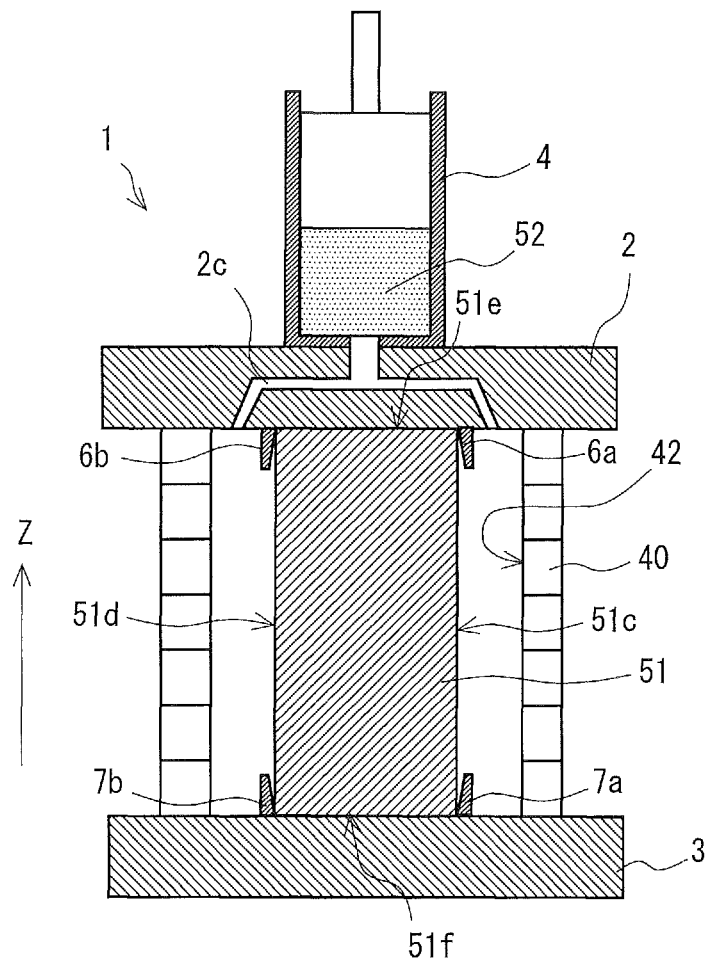
FIG. 9 is a diagram for describing a method of manufacturing the rotor from the rotor core using the rotor manufacturing apparatus according to the first embodiment.

Next, as shown in FIG. 9, the first mold 2 is arranged on one end surface (upper end surface in FIG. 7) of the rotor core 40 in such a way as to seal the opening of the one end side (upper side in FIG. 7) in the axial direction Z of the magnet insertion hole 42. In this case, the surface 51c of the permanent magnet 51 is made to abut against the positioning protrusion part 6a and the surface 51d of the permanent magnet 51 is made to abut against the positioning protrusion part 6b. Accordingly, the permanent magnet 51 is positioned in a predetermined position with respect to the magnet insertion hole 42.

Figure 10:
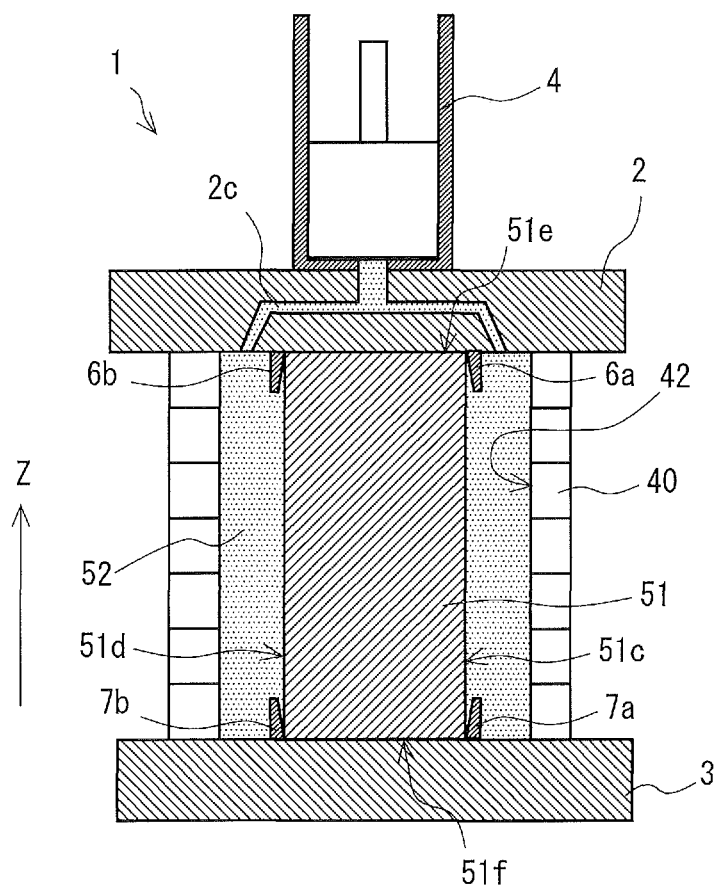
FIG. 10 is a diagram for describing a method of manufacturing the rotor from the rotor core using the rotor manufacturing apparatus according to the first embodiment.
Figure 11:
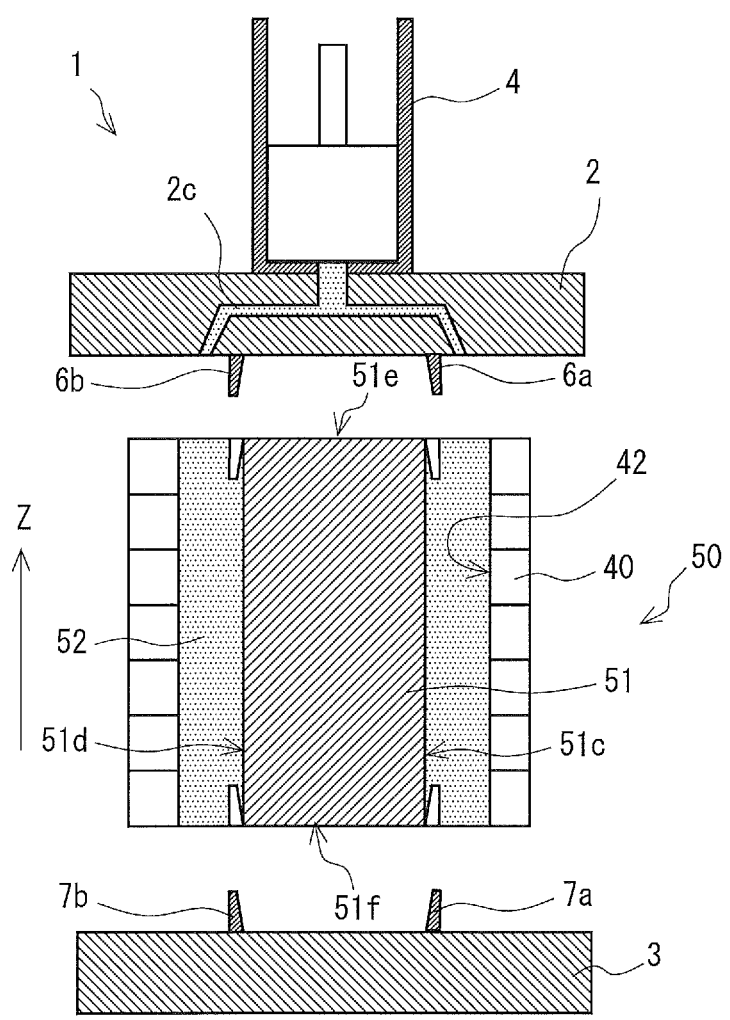
FIG. 11 is a diagram for describing a method of manufacturing the rotor from the rotor core using the rotor manufacturing apparatus according to the first embodiment.

Next, as shown in FIG. 10, the resin material 52 is injected into the magnet insertion hole 42 by the injection apparatus 4. Accordingly, the gap between the permanent magnet 51 and the magnet insertion hole 42 is filled with the resin material 52. The obtained product is left to stand in this state for a while. As shown in FIG. 11, after the resin material 52 that fills the gap between the permanent magnet 51 and the magnet insertion hole 42 is solidified, the first mold 2 and the second mold 3 are removed to obtain the rotor 50.

From the aforementioned description, it is seen that the rotor manufacturing apparatus 1 according to this embodiment includes the first mold 2 and the second mold 3 that are arranged on the respective end surfaces in the axial direction of the rotor core 40 and are intended to seal the magnet insertion hole 42 in the process of filling the gap between the permanent magnet 51 and the magnet insertion hole 42 with the resin material 52 and solidifying the resin material 52. The first mold 2 is provided with the positioning protrusion parts 6a and 6b. Further, the second mold 3 is provided with the positioning protrusion parts 7a and 7b. When the gap between the permanent magnet and the magnet insertion hole is filled with the resin material, the positioning protrusion parts 6a and 6b of the first mold 2 and the positioning protrusion parts 7a and 7b of the second mold 3 position the permanent magnet 51 in a predetermined position with respect to the magnet insertion hole 42. Accordingly, when the gap between the permanent magnet 51 and the magnet insertion hole 42 is filled with the resin material 52, it is possible to suppress the deviation of the position of the permanent magnet 51 with respect to the magnet insertion hole 42, which occurs due to the resin pressure. It is therefore possible to reliably position the permanent magnet 51 in the magnet insertion hole 42.

Figure 18:
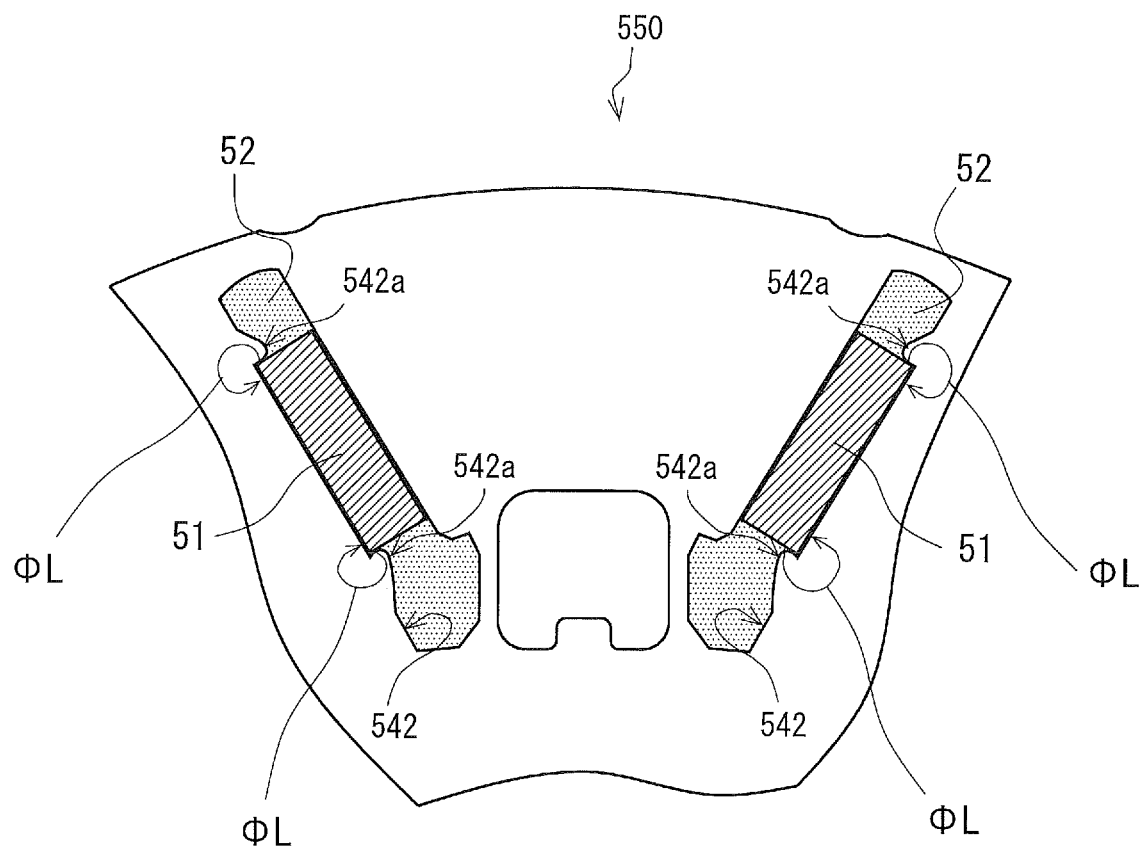
FIG. 18 is a plan view showing a configuration around magnet insertion holes in a rotor which is under development.

Further, as shown in FIG. 18, when the positioning protrusions 542a for the permanent magnet 51 are provided on the side walls of the magnet insertion hole 542, the inefficient magnetic flux $\Phi L$ is generated in the positioning protrusions 542a. In the rotor manufacturing apparatus 1 according to this embodiment, the positioning protrusion parts 6a and 6b are provided in the first mold 2 and the positioning protrusion parts 7a and 7b are provided in the second mold 3. Since the permanent magnet 51 is positioned with respect to the magnet insertion hole 42 using the positioning protrusion parts 6a, 6b, 7a, and 7b, there is no need to provide the positioning protrusions for the permanent magnet 51 on the side walls of the magnet insertion hole 42. It is therefore possible to suppress generation of inefficient magnetic flux.

Second Embodiment

In the following description, with reference to the drawings, a second embodiment of the present invention will be described. The components the same as those in the first embodiment are denoted by the same reference symbols and the descriptions thereof will be omitted.

Figure 12:
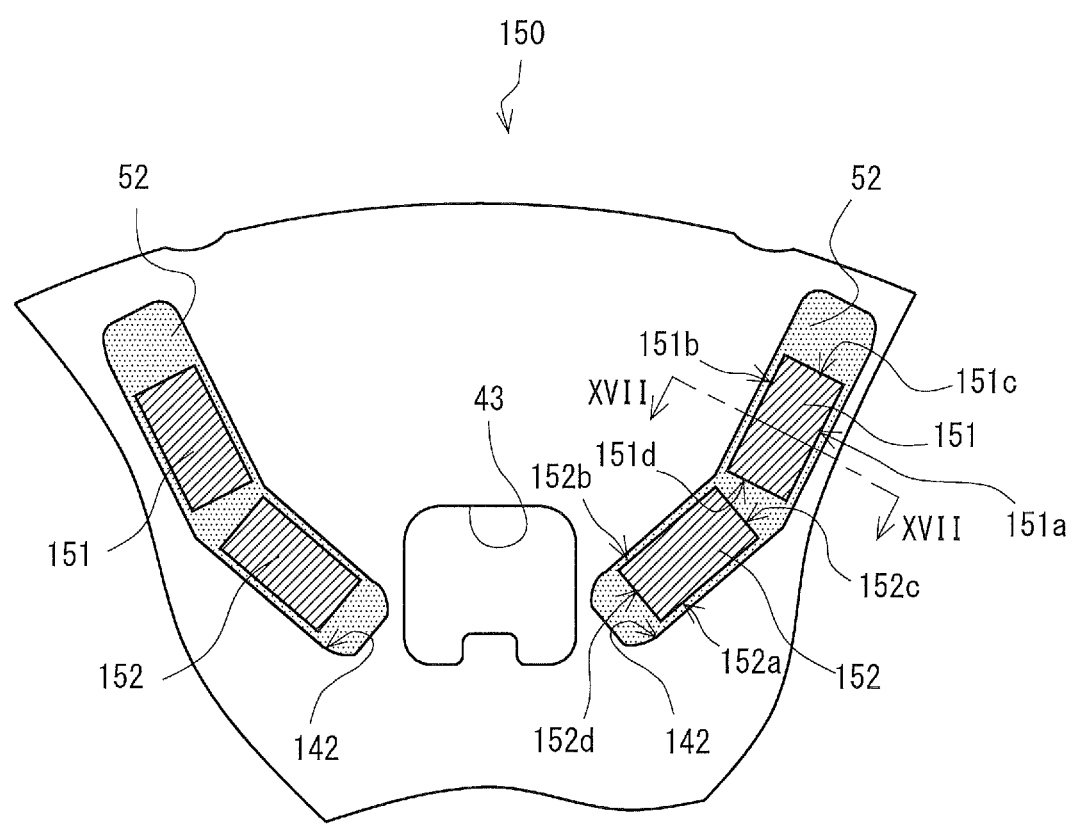
FIG. 12 is a plan view of a rotor manufactured by a rotor manufacturing apparatus according to a second embodiment when the rotor is seen from an axial direction.

FIG. 12 is a plan view of a rotor 150 manufactured by a rotor manufacturing apparatus according to this embodiment when the rotor 150 is seen from the axial direction. FIG. 12 corresponds to FIG. 3, which shows the rotor 50 according to the first embodiment. As shown in FIG. 12, the rotor 150 manufactured by the rotor manufacturing apparatus according to this embodiment includes a magnet insertion hole 142 into which a plurality of permanent magnets 151 and 152 are inserted.

Some studies conducted by the inventor have showed that, when permanent magnets that are adjacent to each other are isolated from each other in the magnet insertion hole, eddy current loss can be reduced. In the rotor 150, the permanent magnet 151 and the permanent magnet 152 that are adjacent to each other are arranged in the magnet insertion hole 142 in such a way that there is a predetermined interval therebetween and are separated from each other by the resin material 52. That is, the permanent magnet 151 and the permanent magnet 152 are isolated from each other.

A configuration of a rotor manufacturing apparatus 101 according to this embodiment will be described below.

Figure 13:
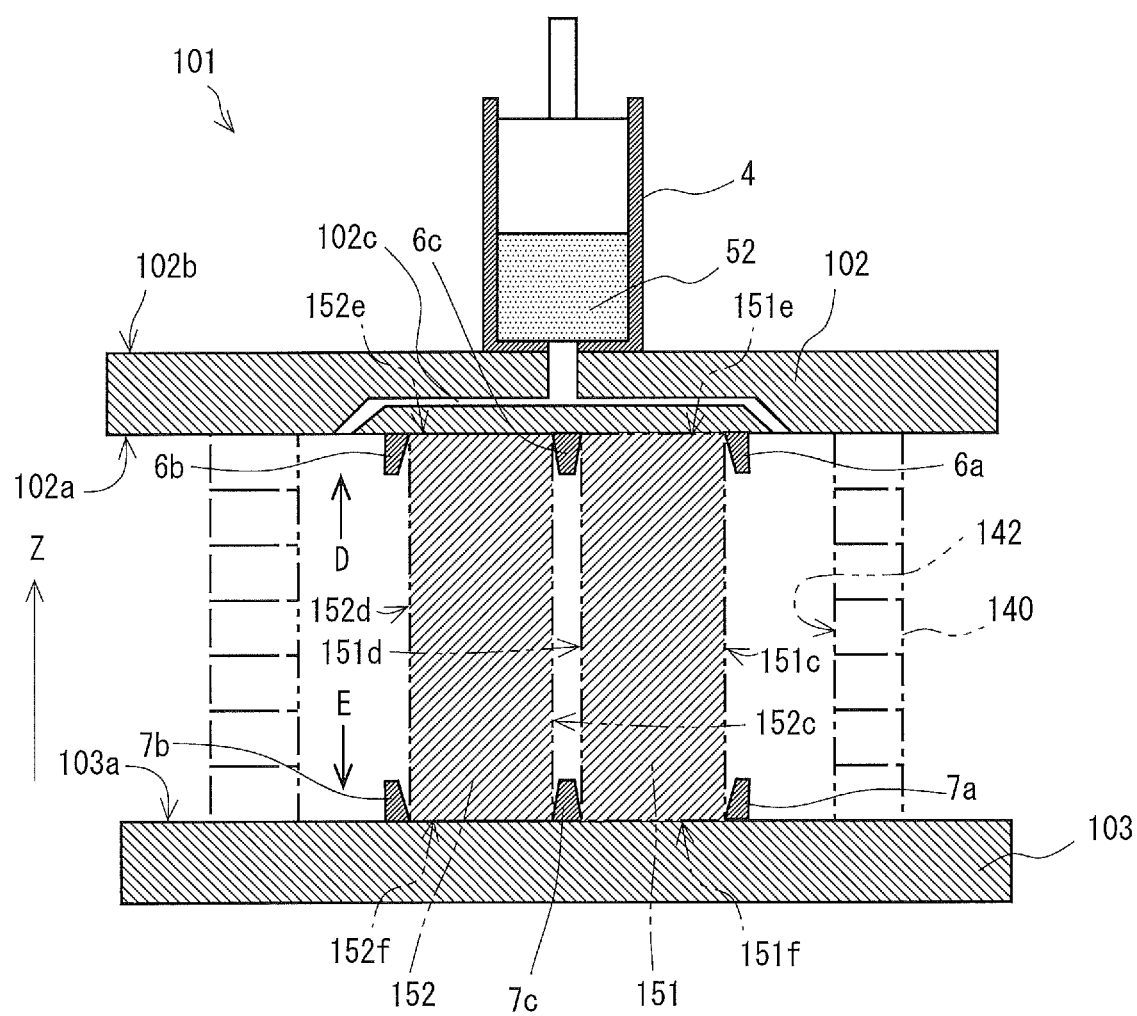
FIG. 13 is a schematic view showing a schematic configuration of the rotor manufacturing apparatus according to the second embodiment.
Figure 14:
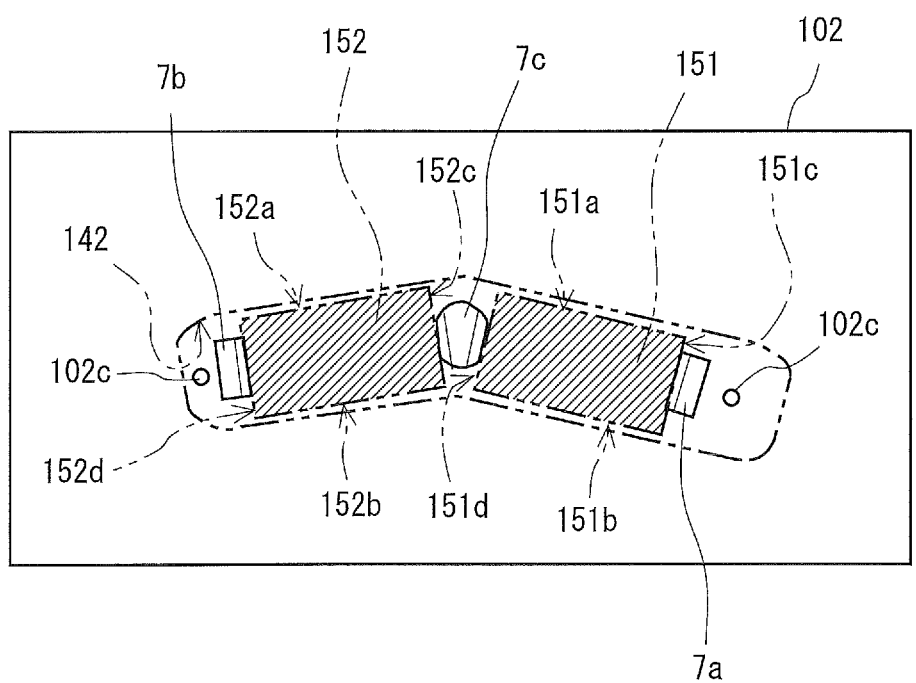
FIG. 14 is an arrow view when seen from an arrow D of FIG. 13.
Figure 15:
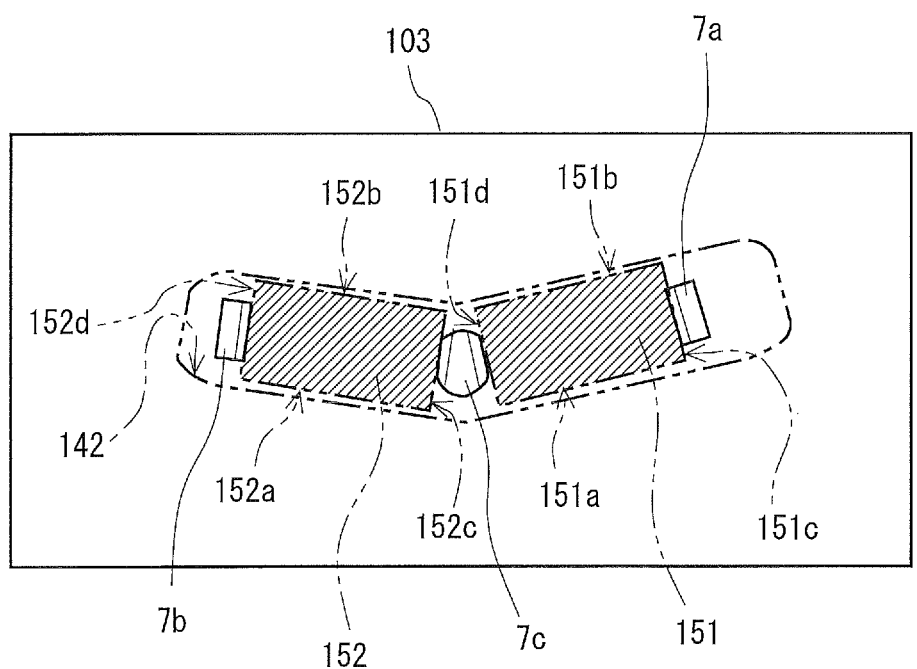
FIG. 15 is an arrow view when seen from an arrow E of FIG. 13.

FIG. 13 is a schematic view showing a schematic configuration of the rotor manufacturing apparatus 101 according to this embodiment. FIG. 13 corresponds to FIG. 4, which shows the rotor manufacturing apparatus 1 according to the first embodiment. A first mold 102 and a second mold 103 in the rotor manufacturing apparatus 101 respectively correspond to the first mold 2 and the second mold 3 in the rotor manufacturing apparatus 1 according to the first embodiment. FIG. 14 is an arrow view when seen from an arrow D of FIG. 13. FIG. 15 is an arrow view when seen from an arrow E of FIG. 13. As shown in FIGS. 13 to 15, the rotor manufacturing apparatus 101 is different from the rotor manufacturing apparatus 1 according to the first embodiment in that a separating protrusion part 6c is provided in the first mold 102 and a separating protrusion part 7c is provided in the second mold 103.

As shown in FIGS. 13 and 14, the first mold 102 seals the opening of one end side (upper side in FIG. 13) in the axial direction Z of the magnet insertion hole 142 in the rotor core 140 into which the permanent magnet 51 has been inserted. The injection apparatus 4 is provided on a surface 102b of the first mold 102, which is opposite to a surface 102a that is opposed to the permanent magnets 151 and 152. In the first mold 102, a path 102c that guides the resin material 52 injected by the injection apparatus 4 to the magnet insertion hole 142 is formed. The positioning protrusion parts 6a and 6b that are protruded in the axial direction Z and are intended to position one end surface 151e of the permanent magnet 151 and one end surface 152e of the permanent magnet 152 (upper end surface in FIG. 13) in the axial direction Z in predetermined positions with respect to the magnet insertion hole 142 are provided on the surface 102a of the first mold 102 that is opposed to the permanent magnets 151 and 152.

Further, the separating protrusion part 6c that is protruded in the axial direction and is intended to arrange the permanent magnets 151 and 152 adjacent to each other in such a way that they are separated from each other in the magnet insertion hole 142 are provided on the surface 102a of the first mold 102 that is opposed to the permanent magnets 151 and 152.

As shown in FIGS. 13 and 15, the second mold 103 seals the opening on the other end side (lower side in FIG. 13) in the axial direction Z of the magnet insertion hole 142 in the rotor core 140 into which the permanent magnet 51 has been inserted. The positioning protrusion parts 7a and 7b that are protruded in the axial direction Z and are intended to position the other end surface 151f of the permanent magnet 151 and the other end surface 152f of the permanent magnet 152 (lower end surface in FIG. 13) in the axial direction Z in predetermined positions with respect to the magnet insertion hole 142 are provided on a surface 103a of the second mold 103 that is opposed to the permanent magnets 151 and 152.

Further, the separating protrusion part 7c that is protruded in the axial direction and is intended to arrange the permanent magnets 151 and 152 adjacent to each other in such a way that they are separated from each other in the magnet insertion hole 142 is provided on the surface 103a of the second mold 103 that is opposed to the permanent magnets 151 and 152.

In the permanent magnet 151, a surface 151c abuts against the positioning protrusion parts 6a and 7a and a surface 151d abuts against the separating protrusion parts 6c and 7c. In the permanent magnet 152, a surface 152c abuts against the separating protrusion parts 6c and 7c and a surface 152d abuts against the positioning protrusion parts 6b and 7b. Accordingly, the permanent magnet 151 and the permanent magnet 152 are positioned in predetermined positions separated from each other in the magnet insertion hole 42. In the state in which the permanent magnet 151 and the permanent magnet 152 are positioned as stated above in the magnet insertion hole 42, the gap between the permanent magnet 51 and the magnet insertion hole 42 is filled with the resin material 52 and the resin material 52 is solidified. Accordingly, as shown in FIG. 12, in the magnet insertion hole 142, the rotor 150 including the permanent magnet 151 and the permanent magnet 152 adjacent to each other and separated from each other by the resin material 52 is obtained.

From the aforementioned description, it is seen that when the rotor 150 is manufactured using the rotor manufacturing apparatus 101 according to this embodiment, the permanent magnet 151 and the permanent magnet 152 that are adjacent to each other in the magnet insertion hole 142 are separated from each other by the resin material 52. Accordingly, there is no need to arrange an insulation film between the permanent magnet 151 and the permanent magnet 152 in order to reduce the eddy current loss. It is therefore possible to reduce the cost for manufacturing the rotor.

In order to cause the permanent magnet 151 to be smoothly inserted between the positioning protrusion part 6a and the separating protrusion part 6c, as shown in FIG. 13, the surface of the positioning protrusion part 6a that is opposed to the surface 151c of the permanent magnet 151 and the surface of the separating protrusion part 6c that is opposed to the surface 151d of the permanent magnet 151 may be inclined surfaces that are inclined with respect to the axial direction. Further, in order to cause the permanent magnet 151 to be smoothly inserted between the positioning protrusion part 7a and the separating protrusion part 7c, as shown in FIG. 13, the surface of the positioning protrusion part 7a that is opposed to the surface 151c of the permanent magnet 151 and the surface of the separating protrusion part 7c that is opposed to the surface 151d of the permanent magnet 151 may be inclined surfaces that are inclined with respect to the axial direction.

In a similar way, in order to cause the permanent magnet 152 to be smoothly inserted between the positioning protrusion part 6b and the separating protrusion part 6c, as shown in FIG. 13, the surface of the positioning protrusion part 6b that is opposed to the surface 152d of the permanent magnet 152 and the surface of the separating protrusion part 6c that is opposed to the surface 152c of the permanent magnet 152 may be inclined surfaces that are inclined with respect to the axial direction. Further, in order to cause the permanent magnet 152 to be smoothly inserted between the positioning protrusion part 7b and the separating protrusion part 7c, as shown in FIG. 13, the surface of the positioning protrusion part 7b that is opposed to the surface 152d of the permanent magnet 152 and the surface of the separating protrusion part 7c that is opposed to the surface 152c of the permanent magnet 152 may be inclined surfaces that are inclined with respect to the axial direction.

In the rotor 150 shown in FIG. 12, in order to isolate the permanent magnets 151 and 152 from the side walls of the magnet insertion hole 142 to reduce the eddy current loss, the insulation sheet may be arranged on surfaces 151a and 151b of the permanent magnet 151 and surfaces 152a and 152b of the permanent magnet 152.

Figure 16:
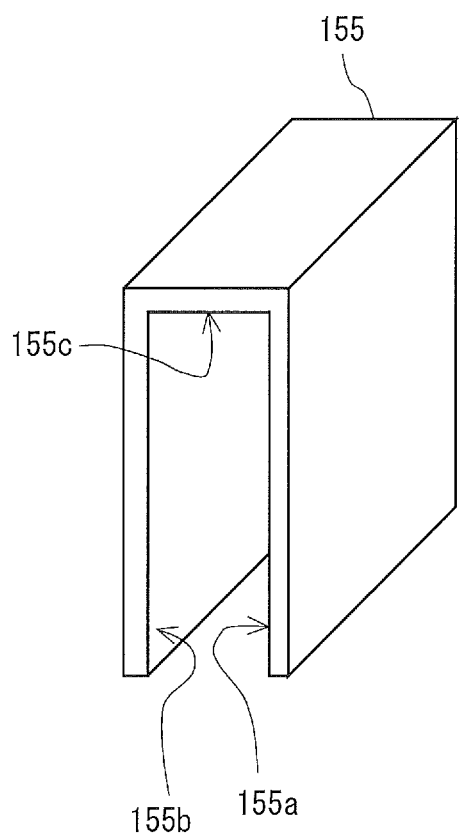
FIG. 16 is a perspective view showing the exterior of an insulation sheet arranged in the permanent magnet.

FIG. 16 is a perspective view showing the exterior of an insulation sheet 155 arranged in the permanent magnets 151 and 152 (see FIG. 12). As shown in FIG. 16, the insulation sheet 155 is formed by being bended at three parts in such a way that the insulation sheet is substantially U-shaped. A sheet or a film made of, for example, resin, may be used for the insulation sheet 155.

Figure 17:
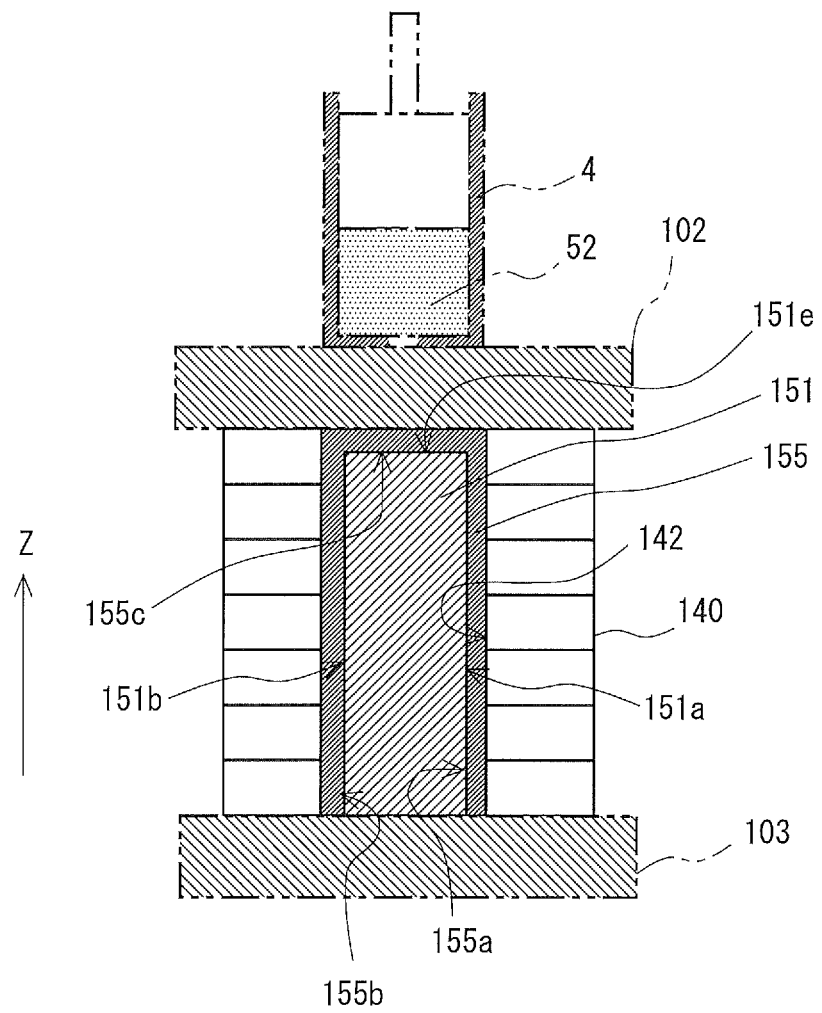
FIG. 17 is a cross-sectional view taken along the line XVII-XVII of FIG. 12 when the insulation sheet shown in FIG. 16 is arranged in the permanent magnet in the rotor shown in FIG. 12.

FIG. 17 is a cross-sectional view taken along the line XVII-XVII of FIG. 12 when the insulation sheet 155 shown in FIG. 16 is arranged in the permanent magnet 151 in the rotor 150 shown in FIG. 12. As shown in FIG. 17, a surface 155a of the insulation sheet 155 contacts the surface 151a of the permanent magnet 151 and a surface 155b of the insulation sheet 155 contacts the surface 151b of the permanent magnet 151.

A surface 155c of the insulation sheet 155 contacts the surface 151e of the permanent magnet 151. The surface 151e of the permanent magnet 151 is a surface that is opposed to the first mold 102 in which the injection apparatus 4 is provided. By arranging the insulation sheet 155 in the permanent magnet 151 in such a way that the surface 155c of the insulation sheet 155 contacts the surface 151e of the permanent magnet 151, it is possible to prevent the movement of the insulation sheet 155 due to the flow of the resin material 52 and the deviation thereof from the predetermined position when the resin material 52 is injected into the gap between the magnet insertion hole 142 and the permanent magnet 151 by the injection apparatus 4.

Similar to the case in which the insulation sheet 155 is arranged in the permanent magnet 151 stated above, the insulation sheet 155 can be arranged in the permanent magnet 152.

Since the surface 151c of the permanent magnet 151 is reliably positioned by the positioning protrusion parts 6a and 7a, it is reliably isolated from the side walls of the magnet insertion hole 42 by the resin material 52. Accordingly, there is no need to arrange the insulation sheet in the surface 151c of the permanent magnet 151. In a similar way, since the surface 152d of the permanent magnet 152 is reliably positioned by the positioning protrusion parts 6b and 7b, it is reliably isolated from the side walls of the magnet insertion hole 42 by the resin material 52. Accordingly, there is no need to arrange the insulation sheet in the surface 152d of the permanent magnet 152.

Further, the surface 151d of the permanent magnet 151 and the surface 152c of the permanent magnet 152 are reliably separated from each other by the separating protrusion parts 6c and 7c and are reliably isolated by the resin material 52. Accordingly, there is no need to arrange the insulation sheet in the surface 151d of the permanent magnet 151 and the surface 152c of the permanent magnet 152.

Note that the present invention is not limited to the aforementioned embodiments and may be changed as appropriate without departing from the spirit of the present invention.

For example, in order to isolate the surfaces 51a and 51b of the permanent magnet 51 from the side walls of the magnet insertion hole 42 in the rotor 50 according to the first embodiment shown in FIG. 3, the insulation sheet having the shape described with reference to FIG. 16 in the second embodiment can be used. Since the surfaces 51c and 51d of the permanent magnet 51 are reliably positioned as stated above, they are reliably isolated from the side walls of the magnet insertion hole 42 by the resin material 52. Accordingly, there is no need to arrange the insulation sheet in the surfaces 51c and 51d of the permanent magnet 51.

While one of the plurality of magnet insertion holes formed in the rotor core is sealed by the first mold and the second mold in the rotor manufacturing apparatus according to the aforementioned embodiments, this structure is merely one example. For example, two or more magnet insertion holes formed in the rotor core may be concurrently sealed. When the rotor manufacturing apparatus is thus formed, in the first mold and the second mold, the aforementioned positioning protrusion part and/or the separating protrusion part are provided in each of the magnet insertion holes that are sealed. Further, the first mold is provided with the injection apparatus in such a way that the resin material is injected into each of the magnet insertion holes that are sealed. The number of injection apparatuses provided in the first mold may be one and a path may be formed in the first mold in such a way that the resin material is injected into each of the magnet insertion holes from this injection apparatus.

While the injection apparatus is provided in the first mold in the rotor manufacturing apparatus according to the aforementioned embodiments, the injection apparatus may be provided in the second mold.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rotor manufacturing apparatus configured to fill a gap between a permanent magnet and a magnet insertion hole with a resin material in a cylindrical rotor core having the magnet insertion hole which penetrates in an axial direction into which the permanent magnet has been inserted, the rotor manufacturing apparatus comprising:

a first mold and a second mold respectively arranged on one end surface and another end surface in the axial direction of the rotor core in order to seal the magnet insertion hole in the process of filling the gap between the permanent magnet and the magnet insertion hole with the resin material and solidifying the resin material, wherein each of the first mold and the second mold has a surface facing the permanent magnet and the surface is provided with a positioning protrusion part that is protrudes from the surface in the axial direction and is intended to position the permanent magnet in a predetermined position with respect to the magnet insertion hole, wherein the one end surface in the axial direction of the permanent magnet is in contact with the surface of the first mold, and the other end surface in the axial direction of the permanent magnet is in contact with the surface of the second mold.

2. The rotor manufacturing apparatus according to claim 1, wherein, when a plurality of the permanent magnets are inserted into the one magnet insertion hole, each of the first mold and the second mold is provided with a separating protrusion part that is protruded in the axial direction and is intended to arrange the permanent magnets that are adjacent to each other in the magnet insertion hole in such a way that they are separated from each other.

* * * * *